US009079201B2

(12) United States Patent
Shkolnikov et al.

(10) Patent No.: US 9,079,201 B2
(45) Date of Patent: Jul. 14, 2015

(54) LIQUID SUPPLY SYSTEM FOR A GRAVITY FEED SPRAY DEVICE

(75) Inventors: Yury Shkolnikov, Glenview, IL (US); Anatoly Gosis, Palatine, IL (US); Mark E. Charpie, Ottawa Lake, MI (US); Marvin D. Burns, Millbury, OH (US)

(73) Assignee: Finishing Brands Holdings Inc., Minneapolis, MN (US)

( * ) Notice: Subject to any disclaimer, the term of this patent is extended or adjusted under 35 U.S.C. 154(b) by 977 days.

(21) Appl. No.: 12/692,329

(22) Filed: Jan. 22, 2010

(65) Prior Publication Data

US 2011/0180632 A1 Jul. 28, 2011

(51) Int. Cl.

| | |
|---|---|
| ***A01G 25/09*** | (2006.01) |
| ***B05B 7/24*** | (2006.01) |
| *B05B 7/08* | (2006.01) |

(52) U.S. Cl.

CPC ............. *B05B 7/2408* (2013.01); *B05B 7/2478* (2013.01); *B05B 7/0815* (2013.01)

(58) Field of Classification Search

CPC .... B05B 9/0861; B05B 7/12; B05B 11/0059; B05B 9/01; B05B 9/03; B05B 7/2478; B05B 7/2408; B05B 7/0815; E04F 21/12; A01G 25/09; B65D 51/16

USPC ......... 239/375, 345, 344, 377, 347, 376, 378, 239/525, 526, 569; 220/23.87, 495.02; 222/188, 481.5

See application file for complete search history.

(56) References Cited

U.S. PATENT DOCUMENTS

| | | | | |
|---|---|---|---|---|
| 386,418 | A * | 7/1888 | Wherry et al. | 222/188 |
| 517,305 | A * | 3/1894 | Schlueter et al. | 222/188 |
| 1,018,193 | A * | 2/1912 | Hinkle | 222/108 |
| 2,065,829 | A | 12/1936 | Schwab | |
| 2,156,313 | A | 5/1939 | Schwab | |
| 2,637,470 | A | 5/1953 | Wolcott | |
| 3,240,398 | A * | 3/1966 | Dalton, Jr. | 222/630 |
| 3,254,809 | A | 6/1966 | Breneman | |
| 3,990,609 | A | 11/1976 | Grant | |
| 4,388,997 | A * | 6/1983 | Grime | 220/203.14 |
| 5,165,578 | A | 11/1992 | Laible | |
| 5,226,600 | A * | 7/1993 | Frank | 239/337 |
| 5,307,994 | A | 5/1994 | Hieronymus | |
| 5,570,796 | A | 11/1996 | Brown et al. | |
| 5,779,071 | A | 7/1998 | Brown et al. | |

(Continued)

FOREIGN PATENT DOCUMENTS

| | | |
|---|---|---|
| EP | 0678334 | 10/1995 |
| WO | WO2005077543 | 8/2005 |
| WO | 2009046806 A1 | 4/2009 |

OTHER PUBLICATIONS

Chinese Office Action; Application No. 201180006634.2; Dated Sep. 3, 2014; 7 pages.

(Continued)

*Primary Examiner* — Melanie Tyson
*Assistant Examiner* — Chee-Chong Lee
(74) *Attorney, Agent, or Firm* — Fletcher Yoder P.C.

(57) ABSTRACT

A system is provided for venting a container used to supply a liquid to a spray coating device. The system may include a container cover having a buffer chamber, a liquid conduit configured to extend into a liquid container, a first vent conduit that extends into the buffer chamber, and a second vent conduit that extends from the buffer chamber to the liquid container.

19 Claims, 8 Drawing Sheets

(56) References Cited

U.S. PATENT DOCUMENTS

| | | | | |
|---|---|---|---|---|
| 6,712,292 | B1 | 3/2004 | Gosis et al. | |
| 6,820,824 | B1 * | 11/2004 | Joseph et al. | 239/346 |
| 6,957,751 | B2 | 10/2005 | Ophardt | |
| 7,086,549 | B2 | 8/2006 | Kosmyna et al. | |
| 7,344,040 | B2 | 3/2008 | Kosmyna et al. | |
| 7,360,671 | B2 | 4/2008 | Slade | |
| 7,380,680 | B2 | 6/2008 | Kosmyna et al. | |
| 2006/0201902 | A1 | 9/2006 | Brown et al. | |
| 2006/0261185 | A1 | 11/2006 | Joseph et al. | |

OTHER PUBLICATIONS

Mexican Office Action; Application No. MX/a/2012/008248; Dated Sep. 17, 2014; 3 pages.

* cited by examiner

LIQUID SUPPLY SYSTEM FOR A GRAVITY FEED SPRAY DEVICE

BACKGROUND

The invention relates generally to spray devices, and, more particularly, to venting systems for liquid supply containers for spray devices.

Spray coating devices are used to apply a spray coating to a wide variety of target objects. Spray coating devices often include many reusable components, such as a container to hold a liquid coating material (e.g., paint) on a gravity feed spray device. Unfortunately, a considerable amount of time is spent cleaning these reusable components. In addition, the liquid coating material is often transferred from a mixing cup to the container coupled to the gravity feed spray device. Again, a considerable amount of time is spent transferring the liquid coating material.

BRIEF DESCRIPTION

In a first embodiment, a system includes a container cover having a buffer chamber, a liquid conduit configured to extend into a liquid container, a first vent conduit that extends into the buffer chamber, and a second vent conduit that extends from the buffer chamber to the liquid container.

In a second embodiment, a spray coating system having a spray coating supply container with a volume, and a capillary action vent system coupled to the spray coating supply container. The capillary action vent system includes a buffer chamber and a first capillary tube coupled to the buffer chamber.

In a third embodiment, a spray coating system having a spray gun, and a capillary action vent system coupled to the spray gun. The capillary action vent system includes a buffer chamber and a first capillary tube coupled to the buffer chamber.

DRAWINGS

These and other features, aspects, and advantages of the present invention will become better understood when the following detailed description is read with reference to the accompanying drawings in which like characters represent like parts throughout the drawings, wherein.

Figure 1:
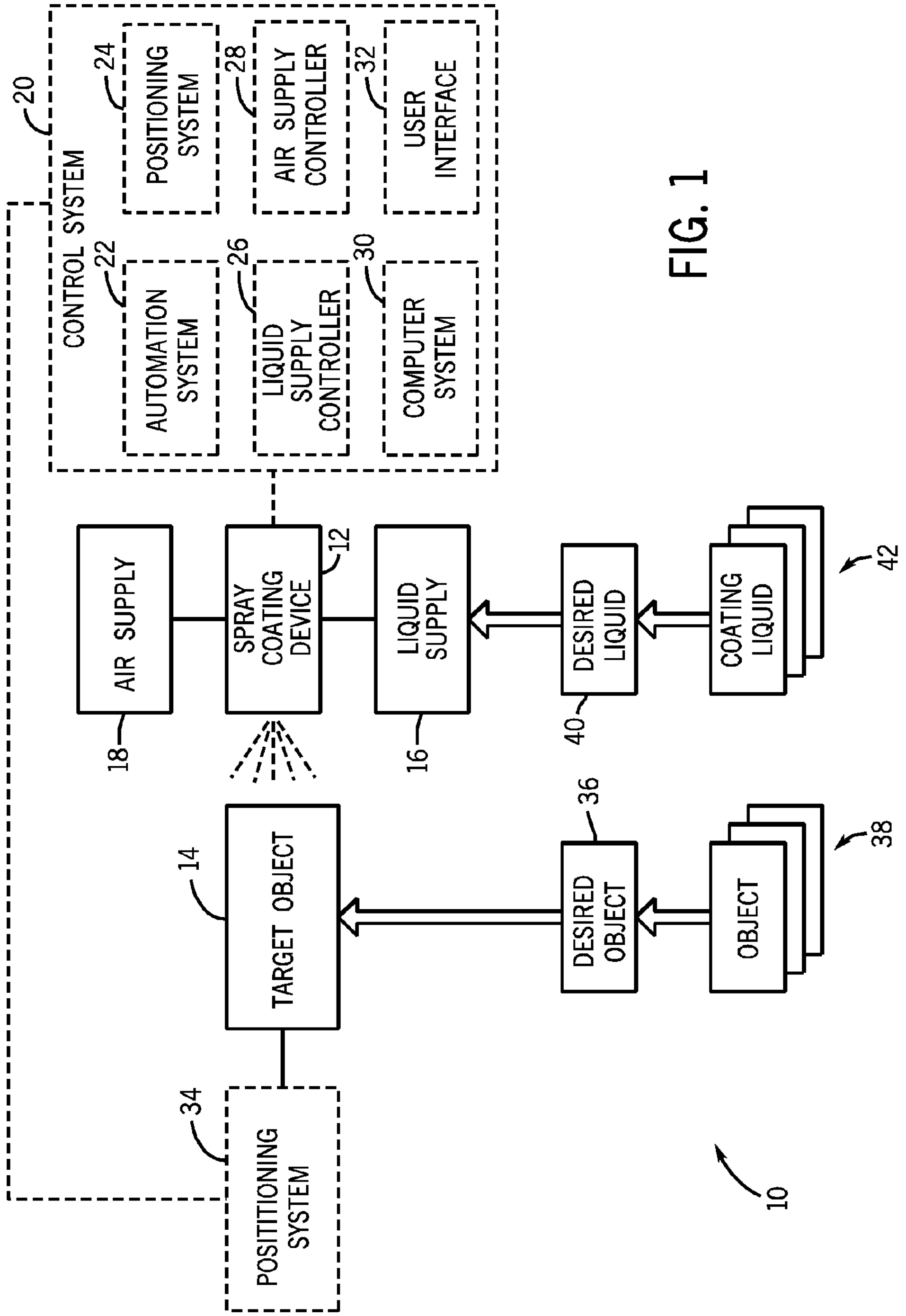
FIG. 1 is a block diagram illustrating an embodiment of a spray coating system having a unique gravity feed container assembly.
Figure 7:
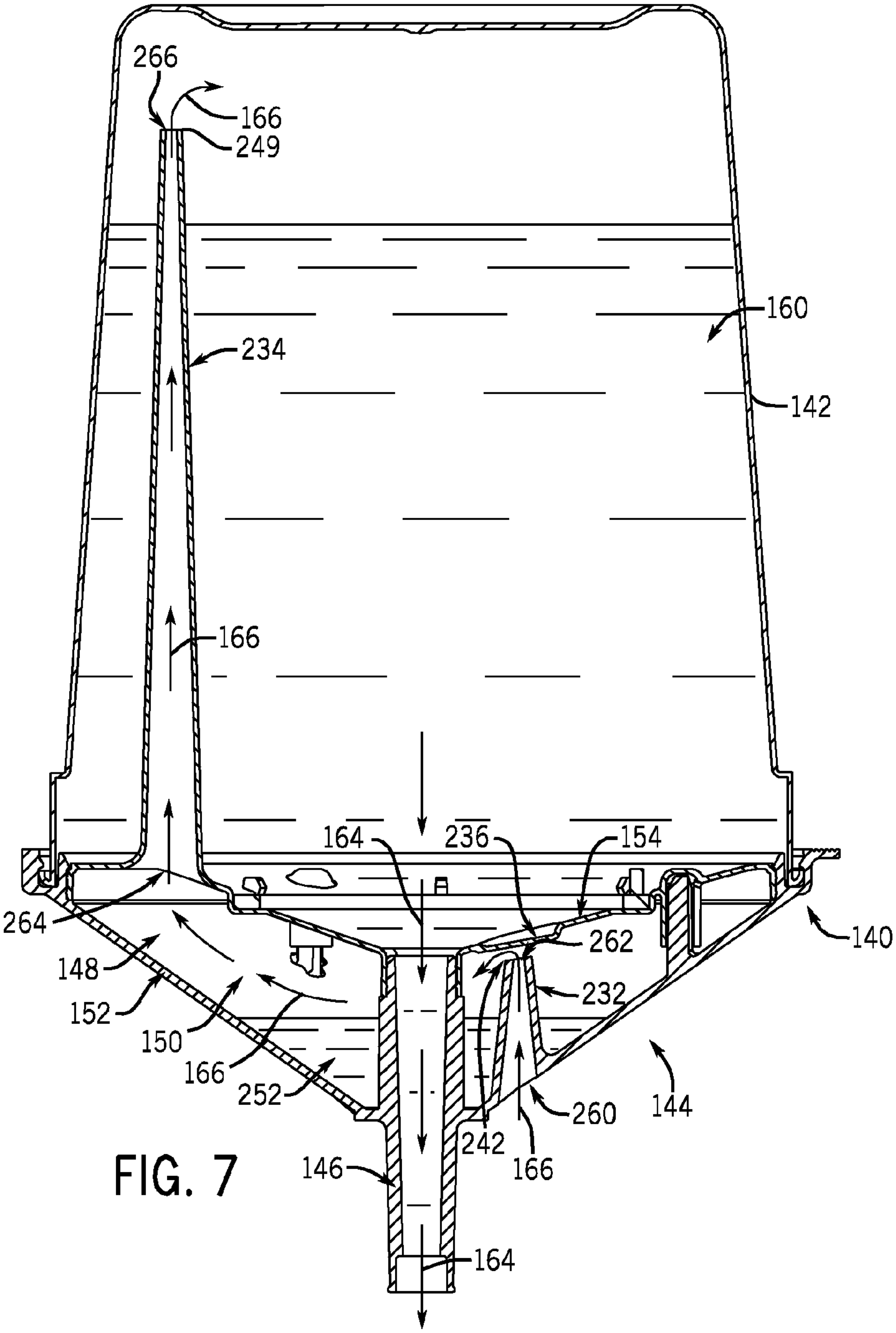
Figure 8:
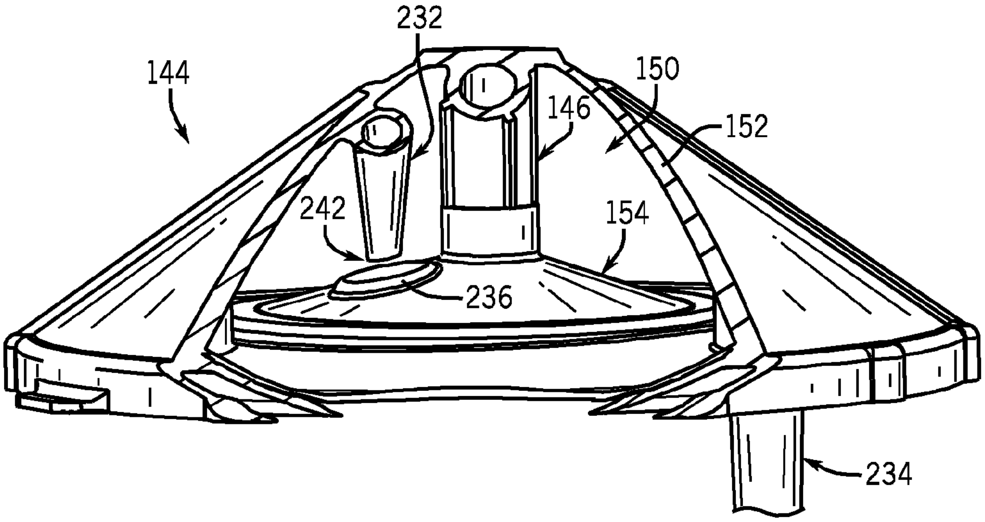

FIG. 7 is a cross-sectional side view of an embodiment of the unique gravity feed container assembly of FIG. 1, illustrating a cover assembly and a container oriented in a cover side down position; and FIG. 8 is a cutaway perspective view of an embodiment of a cover assembly of the unique gravity feed container assembly of FIG. 1, illustrating a buffer chamber having a tapered vent conduit adjacent a protruding portion.

DETAILED DESCRIPTION

As described in detail below, a unique capillary action venting system is provided to vent a container while blocking liquid leakage. In particular, embodiments of the capillary action venting system include a buffer chamber and one or more capillary tubes. For example, the venting system may include the buffer chamber and two capillary tubes that are offset from one another. The offset between the two capillary tubes provides an intermediate venting path for air, while also providing a volume to contain any liquid leaked from one of the capillary tubes. Each capillary tube is configured to resist liquid flow out of the container, thereby substantially containing the liquid within the container. For example, a distal opening of each capillary tube may resist liquid flow due to formation of a meniscus, i.e., surface tension. In some embodiments, the distal opening may be positioned proximate to a surface to further resist liquid flow due to surface tension. By further example, an interior of each capillary tube may resist liquid flow due to surface tension. Each capillary tube may have a hollow annular geometry, such as a cylindrical shape or a conical shape. A conical capillary tube provides additional resistance to liquid flow due to the reduced diameter of the opening at the smaller end.

Turning now to the drawings, FIG. 1 is a flow chart illustrating an exemplary spray coating system 10, which comprises a spray coating gun 12 having the unique gravity feed container assembly for applying a desired coating liquid to a target object 14. The spray coating gun 12 may be coupled to a variety of supply and control systems, such as a liquid supply 16 having the unique gravity feed container assembly, an air supply 18, and a control system 20. The control system 20 facilitates control of the liquid and air supplies 16 and 18 and ensures that the spray coating gun 12 provides an acceptable quality spray coating on the target object 14. For example, the control system 20 may include an automation system 22, a positioning system 24, a liquid supply controller 26, an air supply controller 28, a computer system 30, and a user interface 32. The control system 20 may also be coupled to a positioning system 34, which facilitates movement of the target object 14 relative to the spray coating gun 12. Accordingly, the spray coating system 10 may provide a computer-controlled mixture of coating liquid, liquid and air flow rates, and spray pattern.

The spray coating system 10 of FIG. 1 is applicable to a wide variety of applications, liquids, target objects, and types/configurations of the spray coating gun 12. For example, a user may select a desired liquid 40 from a plurality of different coating liquids 42, which may include different coating types, colors, textures, and characteristics for a variety of materials such as metal and wood. The user also may select a desired object 36 from a variety of different objects 38, such as different material and product types. The spray coating gun 12 also may comprise a variety of different components and spray formation mechanisms to accommodate the target object 14 and liquid supply 16 selected by the user. For example, the spray coating gun 12 may comprise an air atomizer, a rotary atomizer, an electrostatic atomizer, or any other suitable spray formation mechanism.

Figure 2:
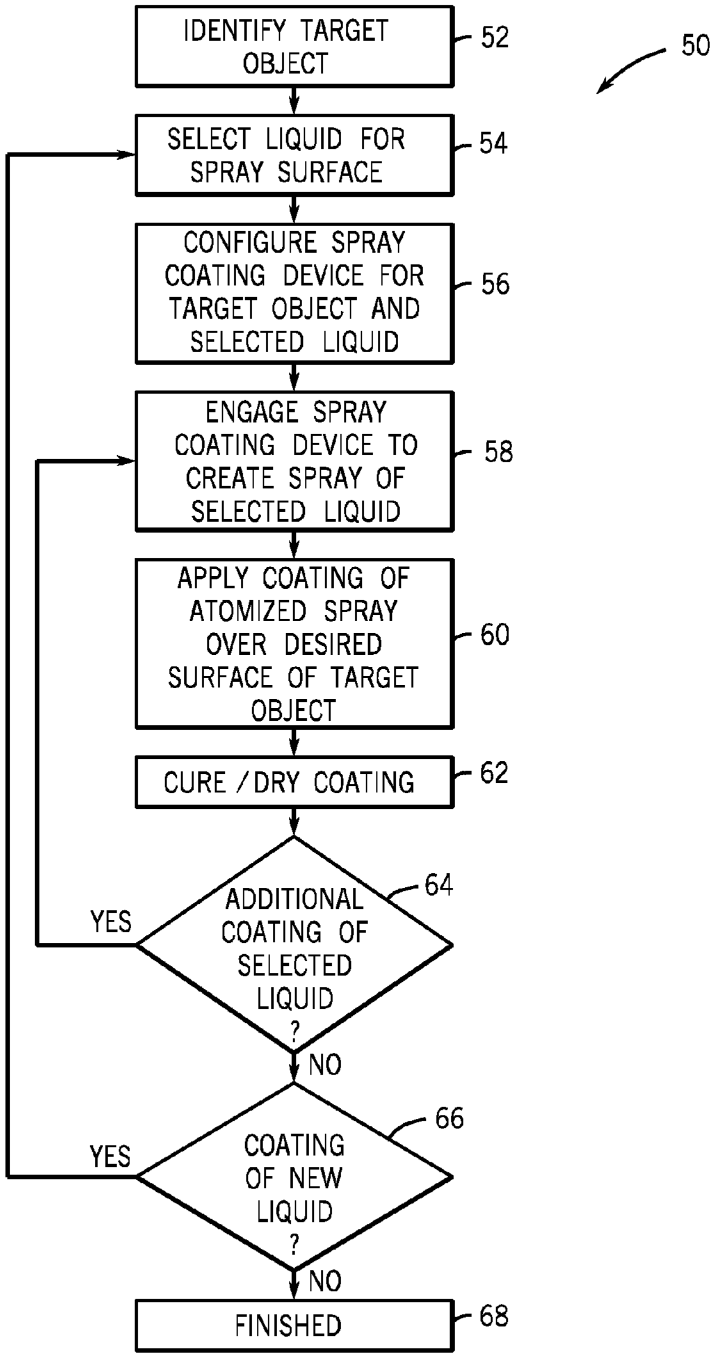
FIG. 2 is a flow chart illustrating an embodiment of a spray coating process utilizing the unique gravity feed container assembly of FIG. 1.

FIG. 2 is a flow chart of an exemplary spray coating process 50 for applying a desired spray coating liquid to the target object 14. As illustrated, the process 50 proceeds by identifying the target object 14 for application of the desired liquid (block 52). The process 50 then proceeds by selecting the desired liquid 40 for application to a spray surface of the target object 14 (block 54). A user may then proceed to configure the spray coating gun 12 for the identified target object 14 and selected liquid 40 (block 56). As the user engages the spray coating gun 12, the process 50 then proceeds to create an atomized spray of the selected liquid 40 (block 58). The user may then apply a coating of the atomized spray over the desired surface of the target object 14 (block 60). The process 50 then proceeds to cure/dry the coating applied over the desired surface (block 62). If an additional coating of the selected liquid 40 is desired by the user at query block 64, then the process 50 proceeds through blocks 58, 60, and 62 to provide another coating of the selected liquid 40. If the user does not desire an additional coating of the selected liquid at query block 64, then the process 50 proceeds to query block 66 to determine whether a coating of a new liquid is desired by the user. If the user desires a coating of a new liquid at query block 66, then the process 50 proceeds through blocks 54, 56, 58, 60, 62, and 64 using a new selected liquid for the spray coating. If the user does not desire a coating of a new liquid at query block 66, then the process 50 is finished at block 68.

Figure 3:
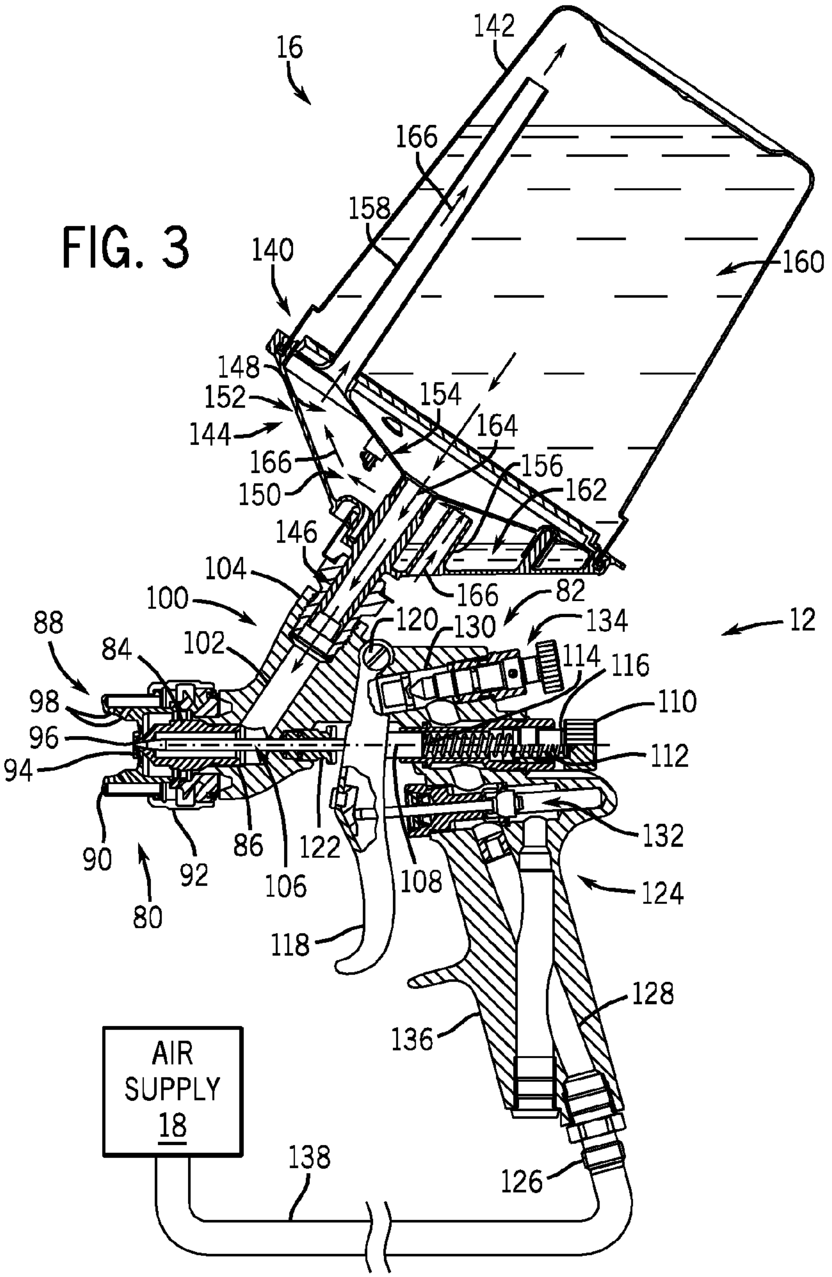
FIG. 3 is a cross-sectional side view of an embodiment of a spray coating device coupled to the unique gravity feed container assembly of FIG. 1.

FIG. 3 is a cross-sectional side view illustrating an embodiment of the spray coating gun 12 coupled to the liquid supply 16. As illustrated, the spray coating gun 12 includes a spray tip assembly 80 coupled to a body 82. The spray tip assembly 80 includes a liquid delivery tip assembly 84, which may be removably inserted into a receptacle 86 of the body 82. For example, a plurality of different types of spray coating devices may be configured to receive and use the liquid delivery tip assembly 84. The spray tip assembly 80 also includes a spray formation assembly 88 coupled to the liquid delivery tip assembly 84. The spray formation assembly 88 may include a variety of spray formation mechanisms, such as air, rotary, and electrostatic atomization mechanisms. However, the illustrated spray formation assembly 88 comprises an air atomization cap 90, which is removably secured to the body 82 via a retaining nut 92. The air atomization cap 90 includes a variety of air atomization orifices, such as a central atomization orifice 94 disposed about a liquid tip exit 96 from the liquid delivery tip assembly 84. The air atomization cap 90 also may have one or more spray shaping air orifices, such as spray shaping orifices 98, which use air jets to force the spray to form a desired spray pattern (e.g., a flat spray). The spray formation assembly 88 also may include a variety of other atomization mechanisms to provide a desired spray pattern and droplet distribution.

The body 82 of the spray coating gun 12 includes a variety of controls and supply mechanisms for the spray tip assembly 80. As illustrated, the body 82 includes a liquid delivery assembly 100 having a liquid passage 102 extending from a liquid inlet coupling 104 to the liquid delivery tip assembly 84. The liquid delivery assembly 100 also includes a liquid valve assembly 106 to control liquid flow through the liquid passage 102 and to the liquid delivery tip assembly 84. The illustrated liquid valve assembly 106 has a needle valve 108 extending movably through the body 82 between the liquid delivery tip assembly 84 and a liquid valve adjuster 110. The liquid valve adjuster 110 is rotatably adjustable against a spring 112 disposed between a rear section 114 of the needle valve 108 and an internal portion 116 of the liquid valve adjuster 110. The needle valve 108 is also coupled to a trigger 118, such that the needle valve 108 may be moved inwardly away from the liquid delivery tip assembly 84 as the trigger 118 is rotated counter clockwise about a pivot joint 120. However, any suitable inwardly or outwardly openable valve assembly may be used within the scope of the present technique. The liquid valve assembly 106 also may include a variety of packing and seal assemblies, such as packing assembly 122, disposed between the needle valve 108 and the body 82.

An air supply assembly 124 is also disposed in the body 82 to facilitate atomization at the spray formation assembly 88. The illustrated air supply assembly 124 extends from an air inlet coupling 126 to the air atomization cap 90 via air passages 128 and 130. The air supply assembly 124 also includes a variety of seal assemblies, air valve assemblies, and air valve adjusters to maintain and regulate the air pressure and flow through the spray coating gun 12. For example, the illustrated air supply assembly 124 includes an air valve assembly 132 coupled to the trigger 118, such that rotation of the trigger 118 about the pivot joint 120 opens the air valve assembly 132 to allow air flow from the air passage 128 to the air passage 130. The air supply assembly 124 also includes an air valve adjustor 134 to regulate the air flow to the air atomization cap 90. As illustrated, the trigger 118 is coupled to both the liquid valve assembly 106 and the air valve assembly 132, such that liquid and air simultaneously flow to the spray tip assembly 80 as the trigger 118 is pulled toward a handle 136 of the body 82. Once engaged, the spray coating gun 12 produces an atomized spray with a desired spray pattern and droplet distribution.

In the illustrated embodiment of FIG. 3, the air supply 18 is coupled to the air inlet coupling 126 via air conduit 138. Embodiments of the air supply 18 may include an air compressor, a compressed air tank, a compressed inert gas tank, or a combination thereof. In the illustrated embodiment, the liquid supply 16 is directly mounted to the spray coating gun 12. The illustrated liquid supply 16 includes a container assembly 140, which includes a container 142 and a cover assembly 144. In some embodiments, the container 142 may be a flexible cup made of a suitable material, such as polypropylene. Furthermore, the container 142 may be disposable, such that a user may discard the container 142 after use.

The cover assembly 144 includes a liquid conduit 146 and a vent system 148. The vent system 148 includes a buffer chamber 150 disposed between an outer cover 152 and an inner cover 154. The liquid conduit 146 is coupled to the inner and outer covers 152 and 152, and extends through the buffer chamber 150 without any liquid openings in communication with the buffer chamber 150. The vent system 148 also includes a first vent conduit 156 coupled to the outer cover 152 and terminating within the buffer chamber 150, and a second vent conduit 158 coupled to the inner cover 154 and terminating outside of the buffer chamber 150 within the container 142. In other words, the first and second vent conduits 158 have openings in communication with one another through the buffer chamber 150.

In certain embodiments, all or some of the components of the container assembly 140 may be made of a disposable and/or recyclable material, such as a transparent or translucent plastic, a fibrous or cellulosic material, a non-metallic material, or some combination thereof. For example, the container assembly 140 may be made entirely or substantially (e.g., greater than 75, 80, 85, 90, 95, 99 percent) from a disposable and/or recyclable material. Embodiments of a plastic container assembly 140 include a material composition consisting essentially or entirely of a polymer, e.g., polyethylene. Embodiments of a fibrous container assembly 140 include a material composition consisting essentially or entirely of natural fibers (e.g., vegetable fibers, wood fibers, animal fibers, or mineral fibers) or synthetic/man-made fibers (e.g., cellulose, mineral, or polymer). Examples of cellulose fibers include modal or bamboo. Examples of polymer fibers include nylon, polyester, polyvinyl chloride, polyolefins, aramids, polyethylene, elastomers, and polyurethane. In certain embodiments, the cover assembly 144 may be designed for a single use application, whereas the container 142 may be used to store a liquid (e.g., liquid paint mixture) between uses with different cover assemblies 144. In other embodiments, the container 142 and the cover assembly 144 may both be disposable and may be designed for a single use or multiple uses before being discarded.

As further illustrated in FIG. 3, the container assembly 140 is coupled to the spray coating gun 12 overhead in a gravity feed configuration. During setup, the container assembly 140 may be filled with a coating liquid (e.g., paint) in a cover side up position separate from the spray coating gun 12, and then the container assembly 140 may be flipped over to a cover side down position for connection with the spray coating gun 12. As the container 142 is flipped over, a portion the coating liquid leaks or flows through the vent conduit 158 into the buffer chamber 150, resulting in a first liquid volume 160 in the container 142 and a second liquid volume 162 in the buffer chamber 150. However, at least some of the liquid remains the vent conduit 158 due to a vacuum pressure in the container 142, a surface tension within the vent conduit 158, and a surface tension at a distal end opening of the vent conduit 158. The buffer chamber 150 is configured to hold the liquid volume 162 that leaked from the container 142 as the container 142 is rotated between a cover side up position and a cover side down position. During use of the spray coating gun 12, the coating liquid flows from the container 142 to the spray coating gun 12 along fluid flow path 164. Concurrently, air enters the container 142 via air flow path 166 through the vent system 148. That is, air flows into the first vent conduit 156, through buffer chamber 150, through the second vent conduit 158, and into the container 142. As discussed in further detail below, the buffer chamber 150 and orientation of the vent conduits 156 and 158 maintains the air flow path 166 (e.g., vent path) in all orientations of the container assembly 140 and spray coating gun 12, while holding leaked coating liquid (e.g., second liquid volume 162) away from openings in the vent conduits 156 and 158. For example, the vent system 148 is configured to maintain the air flow path 166 and hold the liquid volume 162 in the buffer chamber 150 as the container assembly 140 is rotated approximately 0 to 360 degrees in a horizontal plane, a vertical plane, or any other plane.

Figure 4:
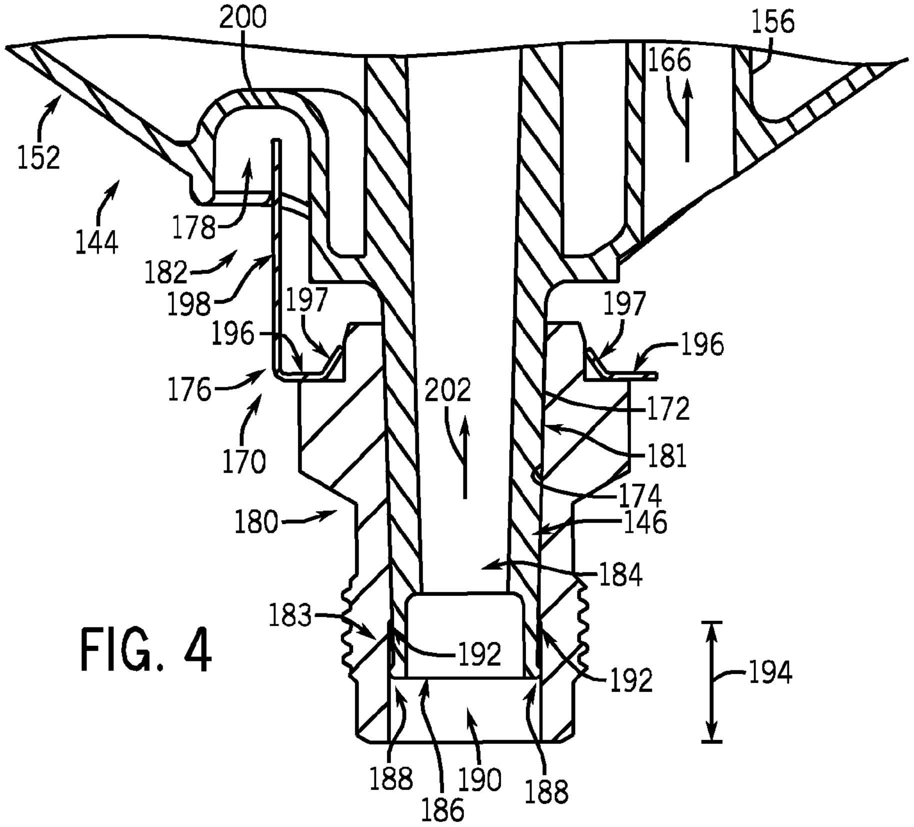
FIG. 4 is a partial cross-sectional view of an embodiment of the unique gravity feed container assembly of FIG. 3, illustrating a spray gun adapter assembly coupled to a cover assembly.

FIG. 4 is a partial cross-sectional view of an embodiment of the unique gravity feed container assembly 140 of FIG. 3, illustrating a spray gun adapter assembly 170 coupled to the cover assembly 144. In the illustrated embodiment, the spray gun adapter assembly 170 includes a spray gun adapter 180 coupled to the cover assembly 144 via a tapered interface 181, a vent alignment guide 182, and a positive lock mechanism 183. For example, the tapered interface 181 may be defined by a tapered exterior surface 172 (e.g., conical exterior) of the liquid conduit 146 and a tapered interior surface 174 (e.g., conical interior) of the adapter 180. By further example, the vent alignment guide 182 may be defined by a first alignment feature 176 disposed on the adapter 180 and a second alignment feature 178 disposed on the outer cover 152. By further example, the positive lock mechanism 183 may include a positive lock mechanism (e.g., radial protrusion) disposed on the tapered exterior surface 172 of the liquid conduit 146, and a mating lock mechanism (e.g., radial recess) disposed on the tapered interior surface 174 of the adapter 180.

In the illustrated embodiment, the liquid conduit 146 may include a liquid passage 184 and a distal end portion 186 with one or more lips 188 that extend radially outward from the liquid conduit 146. In other words, the lips 188 protrude radially outward from the tapered exterior surface 172. The adapter 180 includes an inner passage 190 that is configured to receive the liquid conduit 146, as shown in FIG. 4. As illustrated, the passage 190 has the tapered interior surface 174, which forms a wedge fit and/or friction fit with the tapered exterior surface 172 of the liquid conduit 146. The adapter 180 also includes a groove 192 (e.g., annular groove or radial recess) disposed over a distance 194 along the inner passage 190. In some embodiments, the lip 188 may be disposed in the groove 192 to block axial movement of the liquid conduit 146 relative to the adapter 180.

The vent alignment guide 182 is configured to align the first vent conduit 156, the second vent conduit 158, or a combination thereof, relative to the spray coating gun 12. To that end, in certain embodiments, the vent alignment guide 182 may include the first alignment guide 176 and the second alignment guide 178 configured to align with one another between the adapter 180 and the outer cover 152. In the illustrated embodiment, the first alignment guide 176 includes a ring 196 with inner retention fingers 197 and an alignment tab 198. For example, the inner retention fingers 197 may compressively fit the ring 196 about the adapter 180 by bending slightly as the ring 196 is inserted onto the adapter 180, thereby providing a radial inward retention force (e.g., spring force) onto the adapter 180. As further illustrated, the second alignment guide 178 includes an alignment recess 200 disposed in the outer cover 152. In some embodiments, the alignment tab 198 may be configured to fit within the alignment recess 200 when the adapter 180 is coupled to the liquid conduit 146, as shown in FIG. 4. That is, in presently contemplated embodiments, the vent alignment guide 182 may be the ring 196 having the alignment tab 198, the alignment recess 200, or a combination thereof. Such embodiments of the vent alignment guide 182 may offer distinct advantages. For example, the vent alignment guide 182 may force the second vent conduit 158 to the highest position in the container 142 when attached to the spray coating gun 12 (see FIG. 3). This feature may have the effect of minimizing the fluid volume 162 disposed in buffer volume 150 during use.

During use, the adapter 180 couples the liquid conduit 146 to the spray coating gun 12, and the vent alignment guide 182 aligns the gravity feed container 142 with the gravity feed spray coating gun 12. That is, the vent alignment guide 182 orients the second vent conduit 158 in the container 142 at an upper position within the container 142 while coupled to the spray coating gun 12 (see FIG. 3). The foregoing feature may have the effect of maintaining the availability of the vent system 148 to ensure that the air flow path 166 may be properly established during spray gun use. Furthermore, during operation, the grooves 192 in the adapter 180 may be configured to interface with the lips 188 of the liquid conduit 146 during instances when the container 142 begins to become disengaged from the spray coating gun 12. That is, if the liquid conduit 146 begins to move in direction 202 away from the spray coating gun 12 during use, the liquid conduit 146 may be blocked from dislodging from the adapter 180 when the lips 188 reach the end of the grooves 192. Such a feature may have the effect of safeguarding the connection between the gravity feed container 142 and the gravity feed spray coating gun 12 during operation.

Figure 5:
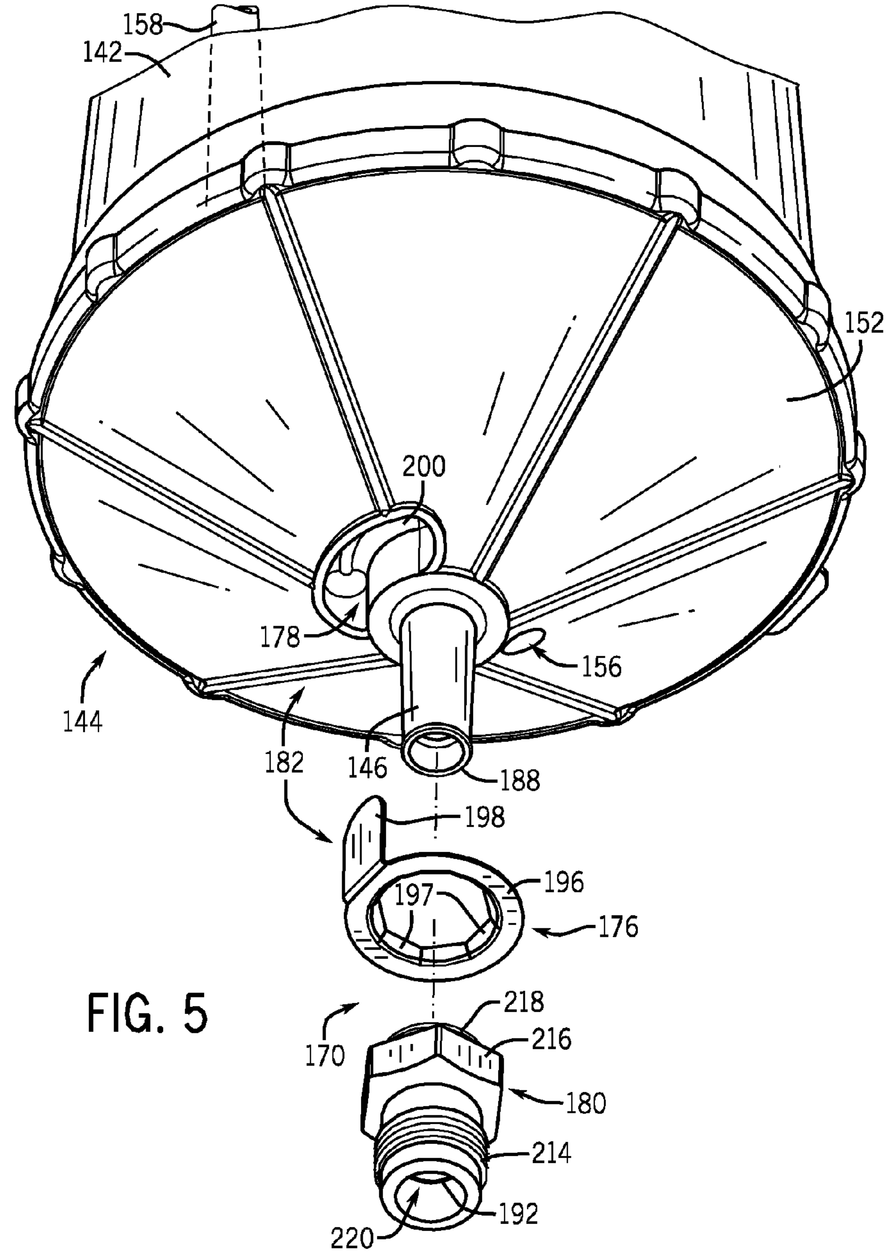
FIG. 5 is a partial exploded perspective view of an embodiment of the unique gravity feed container assembly of FIG. 3, illustrating a spray gun adapter assembly exploded from a cover assembly.

FIG. 5 is a partial exploded perspective view of an embodiment of the unique gravity feed container assembly 140 of FIG. 3, illustrating the spray gun adapter assembly 170 exploded from the cover assembly 144. In the illustrated embodiment, the adapter assembly 170 includes the adapter 180 (e.g., first piece) and the first alignment guide 176 (e.g., second piece). The adapter 180 includes a first threaded portion 214 (e.g., male threaded annular portion), the groove 192, a hexagonal protrusion 216 (e.g., tool head), a securement portion 218 (e.g., male threaded annular portion), and a central passage 220 extending lengthwise through the adapter 180. The first threaded portion 214 is configured to couple to mating threads in the spray coating gun 12 when the container 142 is positioned for use. Additionally, the securement portion 218 is configured to engage with the first alignment guide 176. The first alignment guide 176 includes the alignment ring 196 with inner retention fingers 197 and the alignment tab 198. The inner retention fingers 197 are configured to fit compressively about the securement portion 218 to hold the first alignment guide 176 in position on the adapter 180.

During use, the adapter assembly 170 is coupled to both the spray coating gun 12 and the container assembly 140. As previously mentioned, the alignment tab 198 may be positioned in the alignment recess 200 such that the liquid conduit 146, the first vent conduit 156, the second vent conduit 158, or a combination thereof, are aligned relative to the spray coating gun 12. In other words, the alignment tab 198 may be configured to fit within the alignment recess 200 while the spray gun adapter 180 is coupled to the liquid conduit 146. As illustrated, the alignment recess 200 is disposed intermediate the liquid conduit 146 and the second vent conduit 158, wherein the liquid conduit 146 is disposed intermediate the first and second vent conduits 156 and 158. For example, in certain embodiments, the liquid conduit 146, the first and second vent conduits 156 and 158, and the vent alignment guide 182 (e.g., first and second alignment guides 176 and 178 may be disposed in line with one another, such as in a common plane.

Figure 6:
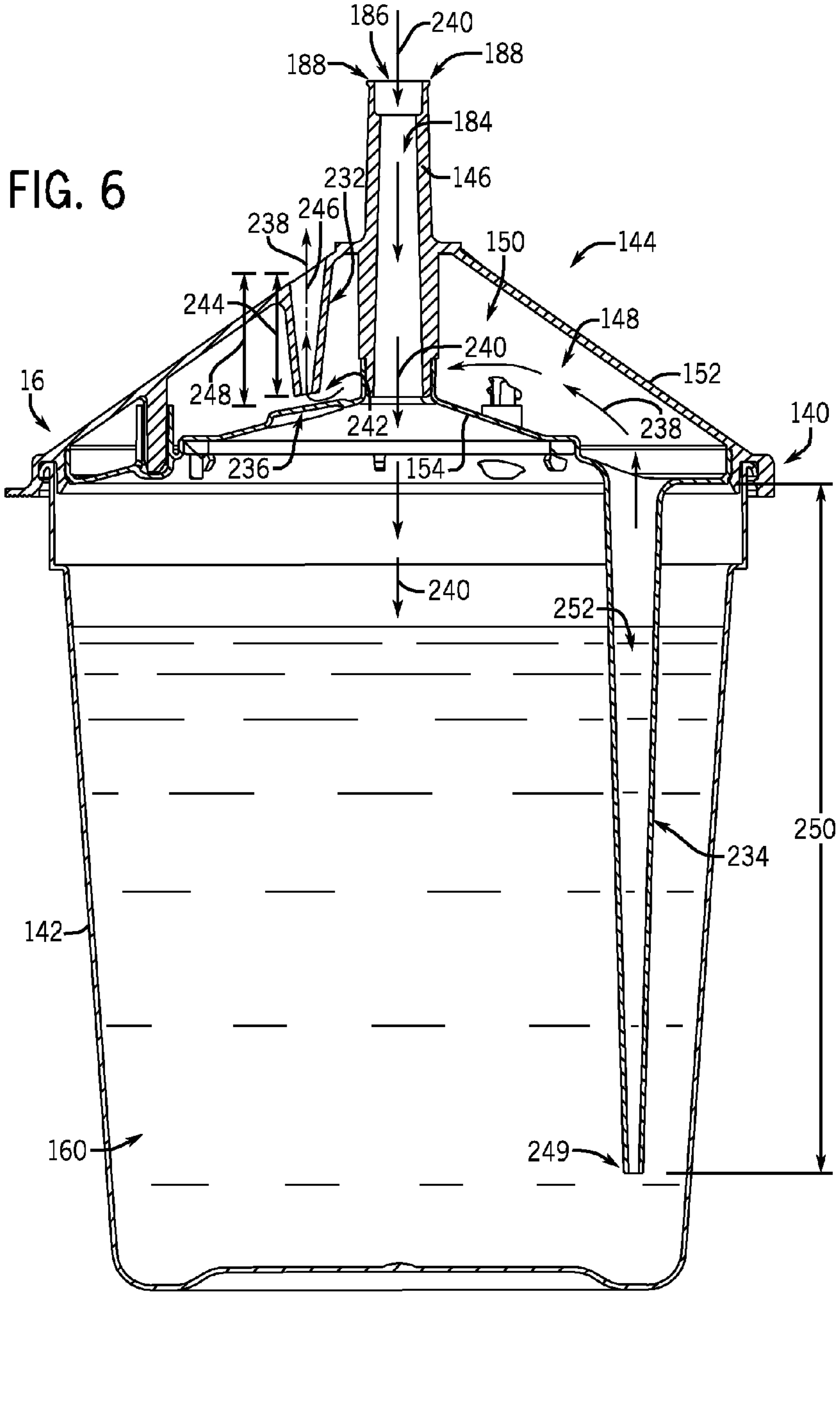
FIG. 6 is a cross-sectional side view of an embodiment of the unique gravity feed container assembly of FIG. 1, illustrating a cover assembly and a container oriented in a cover side up position.

FIGS. 6 and 7 illustrate opposite orientations of the container assembly 140 for purposes of describing operation of the vent system 148, although embodiments of the vent system 148 are operable in any possible orientation of the container assembly 140. FIG. 6 is a cross-sectional side view of an embodiment of the spray coating gun 12 coupled to the liquid supply 16 of FIG. 1, illustrating the unique gravity feed container assembly 140 with the cover assembly 144 and the container 142 oriented in a cover side up position. In particular, the cover assembly 144 is disposed over the container 142 after the container 142 is filled with liquid volume 160. The cover assembly 144 includes the liquid conduit 146 and the vent system 148 coupled to, and extending through, the inner and outer covers 152 and 154. The vent system 148 includes the buffer chamber 150 disposed between the outer cover 152 and an inner cover 154. The vent system 148 also includes a tapered outer vent conduit 232 coupled to the outer cover 152 and a tapered inner vent conduit 234 coupled to the inner cover 154. The vent system 148 further includes a protruding portion 236 (e.g., liquid blocking screen) disposed on the inner cover 154, wherein the protruding portion 236 faces the tapered outer vent conduit 232 in close proximity. Air path 238 is established through the vent system 148 when the container 142 is oriented as shown in FIG. 6. Likewise, liquid path 240 is established into the container 142 in the illustrated orientation of the liquid supply 16.

In the illustrated embodiment, the tapered outer vent conduit 232 extends into the buffer chamber 150 to a distal end 242 between the outer cover 152 and the inner cover 154. The distal end 242 of the outer vent conduit 232 may be in close proximity to the protruding portion 236 (e.g., liquid blocking screen) of the inner cover 154. In other words, the distal end 242 of the outer vent conduit 232 is located at a first distance 244 (i.e., length of conduit 232) from the outer cover 152 along a first axis 246 of the outer vent conduit 232. Additionally, the inner cover 154 is disposed at an offset distance 248 (i.e., total cover spacing) from the outer cover 152 along the first axis 246 of the outer vent conduit 232. In other words, the offset distance 248 is the total distance between the inner and outer covers 152 and 154, whereas the first distance represents the total length of the outer vent conduit 232 protruding from the outer cover 152 toward the inner cover 154. In some embodiments, the first distance 244 (i.e., length of conduit 232) may be at least greater than approximately 50%, 55%, 60%, 65%, 70%, 75%, 80%, 85%, 90%, or 95% of the offset distance 248 (i.e., total cover spacing). For example, in one embodiment, the first distance 244 is at least greater than approximately 50% of the offset distance 248. For further example, in some embodiments, the first distance 244 may be at least greater than 75% of the offset distance 248. Still further, in other embodiments, the first distance 244 may be at least greater than approximately 95% of the offset distance 248. The distal end 242 of the outer vent conduit 232 in close proximity to the inner cover 154 may increase the liquid holding capacity of the buffer chamber 150 while still enabling venting through the vent system 148. Moreover, the close proximity of the distal end 242 of the outer vent conduit 232 to the protrusive portion (e.g., liquid blocking screen) may substantially resist liquid entry into the outer vent conduit 232 from the buffer chamber 150, e.g., during movement (e.g., shaking) of the gravity feed container assembly 140. For example, the close proximity of the distal end 242 to the protrusive portion may provide additional surface tension, which substantially holds the liquid.

In certain embodiments, as illustrated in FIG. 6, the outer vent conduit 232, the inner vent conduit 234, the liquid conduit 146, or a combination thereof, may be tapered. For example, the outer vent conduit 232 may be tapered such that the conduit 232 decreases in diameter from the outer cover 152 toward the distal end 242. For further example, in some embodiments, the liquid conduit 146 may be tapered such that the conduit 146 decreases in diameter from the inner cover 154 toward the distal end portion 186 with the illustrated lip 188. In such embodiments, the tapered liquid conduit 146 may be configured to wedge fit (e.g., interference or friction fit) into a tapered inner passage of the gravity feed spray coating gun 12 (e.g., tapered interior surface 174 of the passage 190 through the adapter 180), and the lip 188 may be configured to fit within a groove in the tapered inner passage (e.g., groove 192 in the passage 190). In still further embodiments, the inner vent conduit 234 may be tapered such that the conduit 234 decreases in diameter from the inner cover 154 toward a distal end 249 at an offset distance 250. In some embodiments, tapering of the outer vent conduit 232, the inner vent conduit 234, the liquid conduit 146, or a combination thereof, may include a taper angle of greater than 0 and less than approximately 10 degrees per side (dps). By further example, the taper angle may be at least equal to or greater than approximately 1, 2, 3, 4, 5, 6, 7, 8, 9, or 10 degrees per side. In tapered embodiments of the vent conduits 232 and 234, a smaller end portion of the conduits is configured to block or reduce inflow of liquid, thereby more effectively maintaining the vent path. In other words, the reduced diameter of the vent conduits 232 and 234 at the distal ends 242 and 249 reduces the flow area and increases the surface tension, thereby reducing the quantity of liquid able to enter the vent conduits 232 and 234.

When the gravity feed container assembly 140 is positioned in a cover side up position, as shown in FIG. 6, the liquid volume 160 remains entirely in the container 142. Additionally, a second liquid volume 252 is disposed within the tapered inner vent conduit 234. Such volumes 160 and 252 are repositioned as the container 142 is rotated between the cover side up position illustrated in FIG. 6 and a cover side down position. FIG. 7 is a cross-sectional side view of an embodiment of the spray coating gun 12 coupled to the liquid supply 16 of FIG. 1, illustrating the unique gravity feed container assembly 140 with the cover assembly 144 and the container 142 oriented in a cover side down position. As illustrated in FIG. 7, the container 142 is filled with liquid volume 160 less the liquid volume 252 from the inner vent conduit 234, while the buffer chamber 150 is filled with the liquid volume 252 from the inner vent conduit 234. That is, as the container 142 is rotated from a cover side up position to a cover side down position, the liquid volume 252 at least partially exits the inner vent conduit 234 and enters buffer chamber 150, where it remains during operation. In certain embodiments, at least some of the liquid volume 252 remains in the inner vent conduit 234 due to a vacuum pressure within the container 142, a surface tension within the inner vent conduit 234, and a surface tension at the distal end 249 of the conduit 234. In certain embodiments, the liquid volume 252 fills only a fraction of the entire volume of the buffer chamber 150. For example, the volume of the inner vent conduit 234 may be a fraction of the volume of the buffer chamber 150, which in turn causes the fractional liquid filling of the buffer chamber 150. In certain embodiments, the volume of the inner vent conduit 234 may be less than approximately 5, 10, 15, 20, 25, 30, 40, 50, 60, or 70 percent of the volume of the buffer chamber 150. In other words, the volume of the buffer chamber 150 may be at least approximately 2, 3, 4, or 5 times greater than the volume of the inner vent conduit 234. As a result, a substantial portion of the buffer chamber 150 remains empty between the outer vent conduit 232 and the inner vent conduit 234, thereby maintaining an open vent path through the cover assembly 144 between the atmosphere and the container 142.

In other words, the vent system 148 may operate to vent air into the container 142 while the liquid volume 252 is disposed in the buffer chamber 150. Specifically, air path 166 (i.e., vent path) may first enter a first outer opening 260 of vent conduit 232 external to the buffer chamber 150 and then enter the buffer chamber 150 via a first inner opening 262 of vent conduit 232. Once inside the buffer chamber 150, the air path 166 continues into a second inner opening 264 of vent conduit 234 internal to the buffer chamber 150. The air path 166 continues through vent conduit 234 and exits a second outer opening 266 external to the buffer chamber 150 but inside the container 142. In this way, the first inner opening 262 and the second inner opening 264 are in pneumatic communication with one another through the buffer chamber 150, while the liquid volume 252 is disposed in the buffer chamber 150. As illustrated, a level of the liquid volume 252 in the buffer chamber 150 remains below the first inner opening 262 of the outer vent conduit 232 and the second inner opening 264 of the inner vent conduit 234. In certain embodiments, the level of the liquid volume 252 may remain below the openings 262 and 264 in any position of the gravity feed container assembly 140, such that the air path 166 always remains open.

Although FIGS. 6 and 7 illustrate only two orientations of the gravity feed container assembly 140, the vent system 148 is configured to maintain an air path 166 through the outer vent conduit 232, the buffer chamber 150, and the inner vent conduit 234 in any orientation. For example, the gravity feed container assembly 140 may be moved approximately 0 to 360 degrees in a vertical plane, approximately 0 to 360 degrees in a horizontal plane, and approximately 0 to 360 degrees in another plane, while continuously maintaining the air path 166 and holding the liquid volume 252 within the buffer chamber 150.

During use, the aforementioned features of the container assembly 140 may allow the operator to shake the container 142, as may be desirable to mix components of the fluid volumes 160 and 252, without loss of liquid. For example, one advantageous feature of presently contemplated embodiments may include the close proximity of the distal end 242 (e.g., opening 262) of the tapered outer vent conduit 232 to the protruding portion 236 (e.g., liquid blocking screen). That is, in certain embodiments, the distance between the distal end 242 (e.g., opening 262) and the protruding portion 236 may be small enough to substantially restrict or block liquid flow into the outer vent conduit 232. For example, the surface tension may retain any liquid along the protruding portion 236, rather than allowing liquid flow into the outer vent conduit 232. Accordingly, in some embodiments, a gap distance between the distal end 242 and the protruding portion 236 may be less than or equal to approximately 1, 2, 3, 4, or 5 millimeters. For example, in one embodiment, the gap distance between the distal end 242 and the protruding portion 236 may be less than approximately 3 millimeters.

Likewise, the tapered geometry of the outer vent conduit 232 (and the reduced diameter of the opening 262) at the distal end 242 may substantially block liquid flow into the outer vent conduit 232. For example, in some embodiments, the diameter of the first inner opening 262 may be less than or equal to approximately 1, 2, 3, 4, or 5 millimeters. For further example, in one embodiment, the diameter of the first inner opening 262 may be less than approximately 3 millimeters. Thus, if a user shakes or otherwise moves the container assembly 140 causing liquid to splash or flow in the vicinity of the position 242, then the small diameter of the conduit 232 and the small gap relative to the protruding portion 236 may substantially restrict any liquid flow out through the outer vent conduit 232. In this manner, the container assembly 140 may substantially block liquid leakage out of the buffer zone 150 through the outer vent conduit 232. Again, the foregoing features may have the effect of containing the liquid volume 252 within buffer chamber 150 during use, even when shaking occurs.

The tapered geometry of the inner vent conduit 234 (and the reduced diameter of the opening 266) at the distal end 249 also may substantially block liquid flow into the inner vent conduit 234. For example, in some embodiments, the diameter of the second outer opening 266 may be less than or equal to approximately 1, 2, 3, 4, or 5 millimeters. For further example, in one embodiment, the diameter of the second outer opening 266 may be less than approximately 3 millimeters. For example, if a user shakes or otherwise moves the container assembly 140 causing liquid to splash or flow in the vicinity of the position 249, then the small diameter of the conduit 234 may substantially restrict any liquid flow through the inner vent conduit 234 into the buffer chamber 150. In this manner, the container assembly 140 may substantially block liquid leakage through the inner vent conduit 234 into the buffer zone 150. The foregoing features may have the effect of containing the liquid volume 160 within the container 142 with the exception of the liquid volume 252 leaked into the buffer zone 150 during rotation (e.g., flipping over).

FIG. 8 is a cross-sectional side view of an embodiment of the cover assembly 144 of FIGS. 6 and 7, illustrating the buffer chamber 150 having the tapered outer vent conduit 232 adjacent the protruding portion 236 (e.g., liquid blocking screen) of the inner cover 154. As illustrated, the protruding portion 236 is located in close proximity to the distal end 242 (e.g., opening 262) of the tapered outer vent conduit 232. Again, the close proximity of the distal end 242 (e.g., opening 262) of the vent conduit 232 to the protruding portion 236 may provide protection against leakage of liquid out through the vent conduit 232 during operation, while also reducing the possibility of liquid blockage of the vent conduit 232. Furthermore, FIG. 8 illustrates positioning of the outer vent conduit 232 relative to the liquid conduit 146 and the inner vent conduit 234. Particularly, in the illustrated embodiment, the outer vent conduit 232 and the inner vent conduit 234 are located on opposite sides of the liquid conduit 146. In certain embodiments, the outer vent conduit 232, the inner vent conduit 234, and the liquid conduit 146 may be disposed in a common plane and/or may have parallel axes.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system, comprising:
a container cover, comprising:
an inner cover comprising a first inner surface;
an outer cover comprising a second inner surface;
a buffer chamber between the first inner surface of the inner cover and the second inner surface of the outer cover;
a liquid conduit;
a first vent conduit coupled to the outer cover, wherein the first vent conduit protrudes away from the second inner surface of the outer cover into the buffer chamber toward the first inner surface of the inner cover; and
a second vent conduit that protrudes away from the buffer chamber, wherein the liquid conduit and the second vent conduit are configured to fluidly couple to an interior volume of a liquid container;
wherein the second inner surface of the outer cover and the first inner surface of the inner cover are separated by a first axial distance on the axis of the first vent conduit, and wherein the first vent conduit extends a second axial distance on the axis of the first vent conduit from the second inner surface of the outer cover through the buffer chamber toward the first inner surface of the inner cover, and the second axial distance is at least 50% of the first axial distance; or
the second vent conduit is configured to extend into the liquid container a third distance that is greater than 50% of a height of the liquid container.

2. The system of claim 1, wherein the first and second vent conduits each comprise a capillary tube.

3. The system of claim 1, wherein the first and second vent conduits each comprise a distal opening that facilitates liquid surface tension to decrease liquid flow, and wherein the first and second vent conduits each comprise an interior surface that facilitates liquid surface tension to decrease liquid flow.

4. The system of claim 1, wherein the container cover comprises an alignment guide configured to align the second vent conduit relative to a spray gun.

5. The system of claim 4, wherein the alignment guide comprises an alignment recess disposed in the container cover.

6. The system of claim 1, wherein the first and second vent conduits are tapered from the first axial end to the second axial end.

7. The system of claim 1, wherein the first and second vent conduits are spaced apart from one another by an offset distance, wherein the offset distance comprises an axial offset and a lateral offset relative to axes of the first and second vent conduits.

8. The system of claim 1, wherein the liquid conduit comprises a tapered liquid conduit with a distal end portion comprising a lip, and wherein the lip is configured to interlock with a spray gun.

9. The system of claim 1, wherein the liquid conduit is coupled to the outer cover and the inner cover, and the second vent conduit is coupled to the inner cover, and the second vent conduit extends to a second distal position offset from the inner cover.

10. The system of claim 9, wherein the inner cover comprises a protruding portion centered and axially aligned with the first vent conduit, and wherein the protruding portion is configured to reduce or block the flow of a liquid into the first vent conduit.

11. The system of claim 1, comprising the liquid container coupled to the container cover, and a spray gun coupled to the container cover.

12. A spray coating system, comprising:
a spray coating supply container comprising a volume; and
a container cover coupled to the spray coating supply container, wherein the container cover comprises:
a capillary action vent system comprising:
an inner cover comprising a first inner surface;
an outer cover comprising a second inner surface;
a buffer chamber between the first inner surface of the inner cover and the second inner surface of the outer covers;
a first capillary tube coupled to the outer cover, wherein the first capillary tube protrudes . . . the first inner surface of the inner cover;
wherein the second inner surface of the outer cover and the first inner surface of the inner cover are separated by a first axial distance on the axis of the first vent conduit, and wherein the first vent conduit extends a second axial distance on the axis of the first vent conduit from the second inner surface of the outer cover through the buffer chamber toward the first inner surface of the inner cover, and the second axial distance is at least 50% of the first axial distance;
a second capillary tube that protrudes away from the buffer chamber; and
a liquid conduit, wherein the liquid conduit and the second capillary tube are configured to fluidly couple to the volume of the spray coating supply container.

13. The system of claim 12, wherein the first capillary tube is configured to resist liquid flow due to surface tension.

14. The system of claim 12, wherein the first capillary tube is a tapered capillary tube.

15. The system of claim 12, wherein the second capillary tube is offset from the first capillary tube.

16. A spray coating system, comprising:
a spray gun; and
a container cover coupled to the spray gun, wherein the container cover comprises;

a capillary action vent system comprising:

an inner cover comprising a first inner surface;

an outer cover comprising a second inner surface;

a buffer chamber between the first inner surface of the inner cover and the second inner surface of the outer cover;

a first capillary tube coupled to the outer cover, wherein the first capillary tube protrudes . . . the first inner surface of the inner cover;

wherein the second inner surface of the outer cover and the first inner surface of the inner cover are separated by a first axial distance on the axis of the first vent conduit, and wherein the first vent conduit extends a second axial distance on the axis of the first vent conduit from the second inner surface of the outer cover through the buffer chamber toward the first inner surface of the inner cover, and the second axial distance is at least 50% of the first axial distance;

a second capillary tube that protrudes away from the buffer chamber; and a liquid conduit, wherein the liquid conduit and the second capillary tube are configured to fluidly couple to an interior volume of a liquid container.

17. The system of claim 16, wherein the second capillary tube is offset from the first capillary tube.

18. The system of claim 16, wherein the first capillary tube is a tapered capillary tube.

19. The system of claim 16, wherein the capillary action vent system comprises an alignment guide configured to align the capillary action vent system relative to the spray gun.

* * * * *